(12) United States Patent
Wang

(10) Patent No.: US 9,777,469 B2
(45) Date of Patent: Oct. 3, 2017

(54) CONTROL VALVE IN WATER CHANNEL

(71) Applicant: Hsiang-Shih Wang, Changhua (TW)

(72) Inventor: Hsiang-Shih Wang, Changhua (TW)

(73) Assignee: GEANN INDUSTRIAL CO. LTD., Changhua (TW)

( * ) Notice: Subject to any disclaimer, the term of this patent is extended or adjusted under 35 U.S.C. 154(b) by 99 days.

(21) Appl. No.: 14/866,962

(22) Filed: Sep. 27, 2015

(65) Prior Publication Data

US 2017/0089049 A1   Mar. 30, 2017

(51) Int. Cl.
  *E03C 1/04*  (2006.01)
  *F16K 3/02*  (2006.01)
  *F16K 31/60*  (2006.01)
  *E03C 1/02*  (2006.01)

(52) U.S. Cl.
  CPC .......... *E03C 1/0412* (2013.01); *F16K 3/0218* (2013.01); *F16K 3/0254* (2013.01); *F16K 31/60* (2013.01); *E03C 2001/026* (2013.01)

(58) Field of Classification Search
  CPC .... E03C 1/0412; F16K 3/0218; F16K 3/0254; F16K 31/60; F16K 11/0787; F16K 27/044; Y10T 137/6851
  See application file for complete search history.

(56) References Cited

U.S. PATENT DOCUMENTS

| 3,433,624 | A | * | 3/1969 | Toth | C22B 1/10 423/148 |
| 3,667,503 | A | * | 6/1972 | Farrell | F16K 11/0655 137/625.4 |
| 3,854,493 | A | * | 12/1974 | Farrell | F16K 11/0787 137/360 |
| 4,325,403 | A | * | 4/1982 | Uhlmann | F16K 11/0787 137/15.22 |
| 4,375,824 | A | * | 3/1983 | von Borries | F16K 11/0787 137/614.17 |
| 4,705,072 | A | * | 11/1987 | Egli | F16K 11/0787 137/625.17 |
| 4,715,406 | A | * | 12/1987 | Kress | F16K 3/0209 137/625.17 |
| 5,372,161 | A | * | 12/1994 | Bechte | F16K 3/08 137/625.17 |
| 5,983,918 | A | * | 11/1999 | Chang | G05D 23/1313 137/100 |
| 6,363,969 | B1 | * | 4/2002 | Schneider | F16K 11/0782 137/625.17 |

(Continued)

*Primary Examiner* — Craig Schneider
*Assistant Examiner* — Kevin Barss
(74) *Attorney, Agent, or Firm* — Che-Yang Chen; Law Offices of Scott Warmuth

(57) ABSTRACT

The present invention provides a control valve for a water channel, which comprises of, from top to bottom, a control shaft bolt, a sliding valve disc, a fixing valve disc and a valve base. A valve shell combining with the valve base covers around a lower portion of the control shaft bolt, the sliding valve disc and the fixing valve disc to prevent mentioned components from falling out. The amount and the open/close operation of the two different kinds of water sources can be operated and controlled by a single control valve of the water channel to simplify the complexity in structure. Also it is convenient for a user to control the amount and the open/close operation of two different water sources by a single control valve.

6 Claims, 7 Drawing Sheets

(56) References Cited

U.S. PATENT DOCUMENTS

| | | | | |
|---|---|---|---|---|
| 7,108,012 B2 * | 9/2006 | Rosko | ............... | F16K 11/0787 137/625.4 |
| 7,134,452 B2 * | 11/2006 | Hiroshi | ............ | F16K 11/0787 137/625.41 |
| 7,628,173 B2 * | 12/2009 | Rosko | ............... | F16K 11/0787 137/625.4 |
| 7,845,574 B2 * | 12/2010 | Mace | ................. | F16K 31/002 137/625.17 |
| 2005/0229983 A1 * | 10/2005 | Chen | ................ | F16K 11/0787 137/625.17 |
| 2007/0044850 A1 * | 3/2007 | Pieters | ............. | F16K 11/0787 137/597 |
| 2012/0326063 A1 * | 12/2012 | Chen | ................ | F16K 27/044 251/129.01 |

* cited by examiner

Page number: 1

CONTROL VALVE IN WATER CHANNEL

FIELD OF THE INVENTION

The present invention relates to a control valve in a water channel, and more particularly to a control valve in a water channel that can control the amount of water and the open/close operation of two different water sources.

BACKGROUND OF THE INVENTION

A conventional control valve for a faucet is used to control the open/close operation or the amount of water flow by rotating or moving up the handle of the faucet.

However, the conventional control valve is disadvantageous because: (i) one control valve can only be used for one kind of flow (such as cold water or tap water). In other words, when a faucet has to provide two different kinds of flows (such as cold water and hot water, or tap water and purified water), there is a need to install another control valve in the faucet. As a result, it increases the complexity of the structure of faucet; and (ii) it is inconvenient for a user to operate two control valves in the same time. Therefore, there remains a need for a new and improved design for a control valve for water channel to overcome the problems presented above.

SUMMARY OF THE INVENTION

The present invention provides a control valve for water channel, which comprises of, from top to bottom, a control shaft bolt, a sliding valve disc, a fixing valve disc and a valve base. A valve shell combining with the valve base covers around a lower portion of the control shaft bolt, the sliding valve disc and the fixing valve disc to prevent mentioned components from falling out. The valve shell has a compartment, and an opening is formed at a top portion of the valve shell. The control shaft bolt is secured in the compartment of the valve shell, and an upper portion of the control shaft bolt penetrates through the opening to stick out from the valve shell. An arc edge vertically protrudes from an inner wall of the valve shell, and two locating slots are formed at relative positions on the arc edge with proper angle. An interval is formed between two ends of the arc edge to receive a rotating channel, and the position of the rotating channel is limited by the arc edge. By connecting the control shaft bolt to a shaft base, the shaft base can be driven to rotate with control shaft bolt simultaneously. Two locating pieces are formed at an outer periphery of the shaft base, and a driving block having an arc edge protrudes from an upper portion of the outer periphery of the shaft base. Two blocking edges are formed at two lateral sides of the driving blocking to achieve blocking effect, and a plurality of driving pins protrudes from a bottom of the shaft base. The bottom of the sliding valve disc has two recessed portions which are a first water sink and a second water sink, and the first water sink and the second water sink are separated with an angle. A plurality of driving grooves is formed at a top of the sliding valve disc, and when the sliding valve disc connects to a top of the fixing valve disc in the compartment, the driving pins are engaged with the driving grooves. The fixing valve disc is penetrated to form a first water inlet and a first water outlet on one side, and to form a second water inlet and a second water outlet on the other side. Also, the first water inlet and the second water inlet are aligned with the first water outlet and the second water outlet. A periphery edge of the fixing valve disc comprises of engaging slots to connect the fixing valve disc with the valve base. The valve base has a first inlet hole, a first outlet hole, a second inlet hole and a second outlet hole, which are at corresponding positions of the first water inlet, the first water outlet, the second water inlet and the second water outlet. A connecting piece are formed at a lateral periphery of the valve base to upwardly engage with the valve shell, and engaging blocks protrude from a surface of the valve base to engage with the engaging slots. As a result, the fixing valve disc can be loaded and secured on the top of the valve base.

Comparing with conventional control valve for water channel, the present invention is advantageous because: (i) the amount and the open/close operation of the two different kinds of water sources can be operated and controlled by a single control valve of the water channel to simplify the complexity in structure; and (ii) it is convenient for a user to control the amount and the open/close operation of two different kinds of water sources by a single control valve.

DETAILED DESCRIPTION OF THE INVENTION

Figure 1:
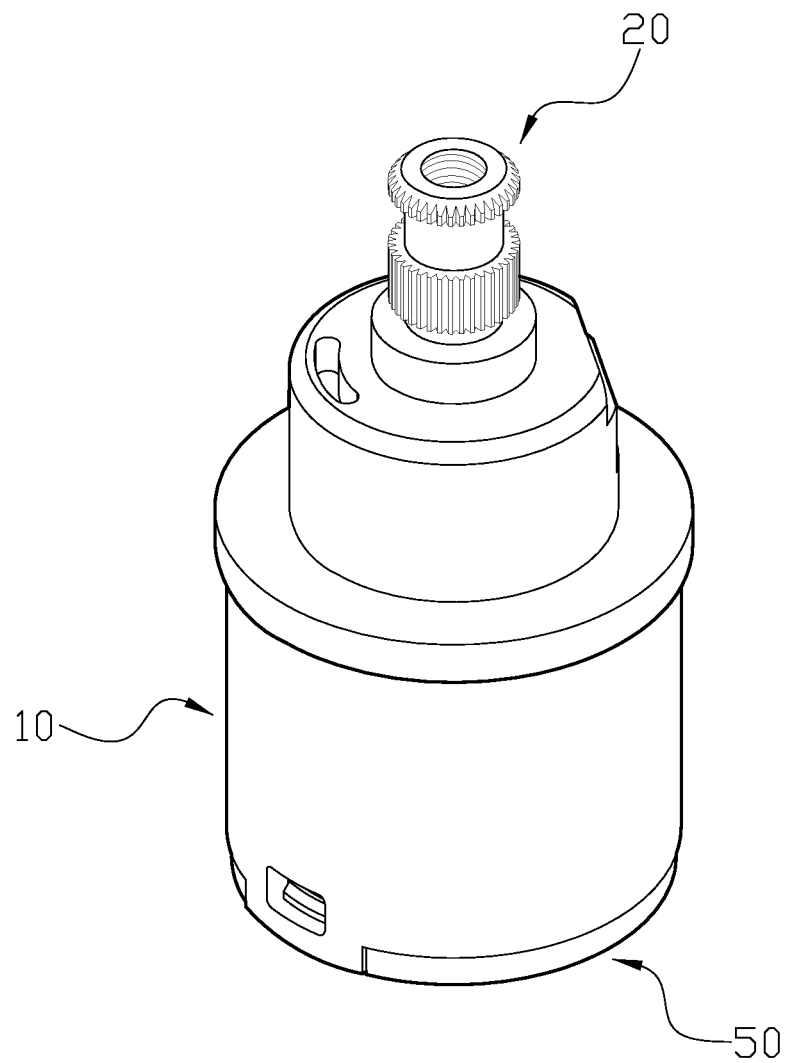
FIG. 1 is a three-dimensional, assembly diagram of the control valve for water channel in the present invention.
Figure 2:
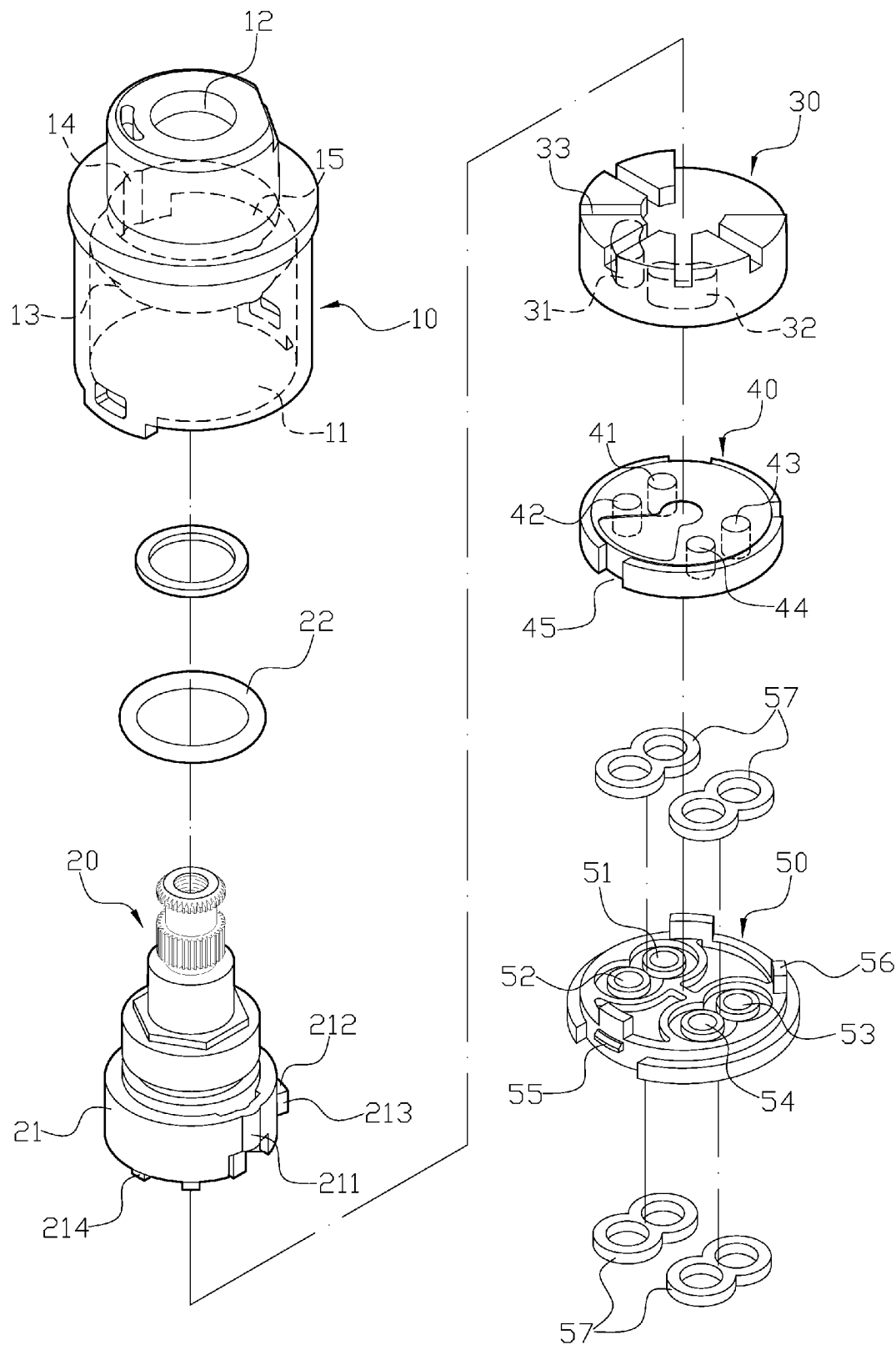
FIG. 2 is a three-dimensional, exploded view of the control valve for water channel in the present invention.
Figure 3:
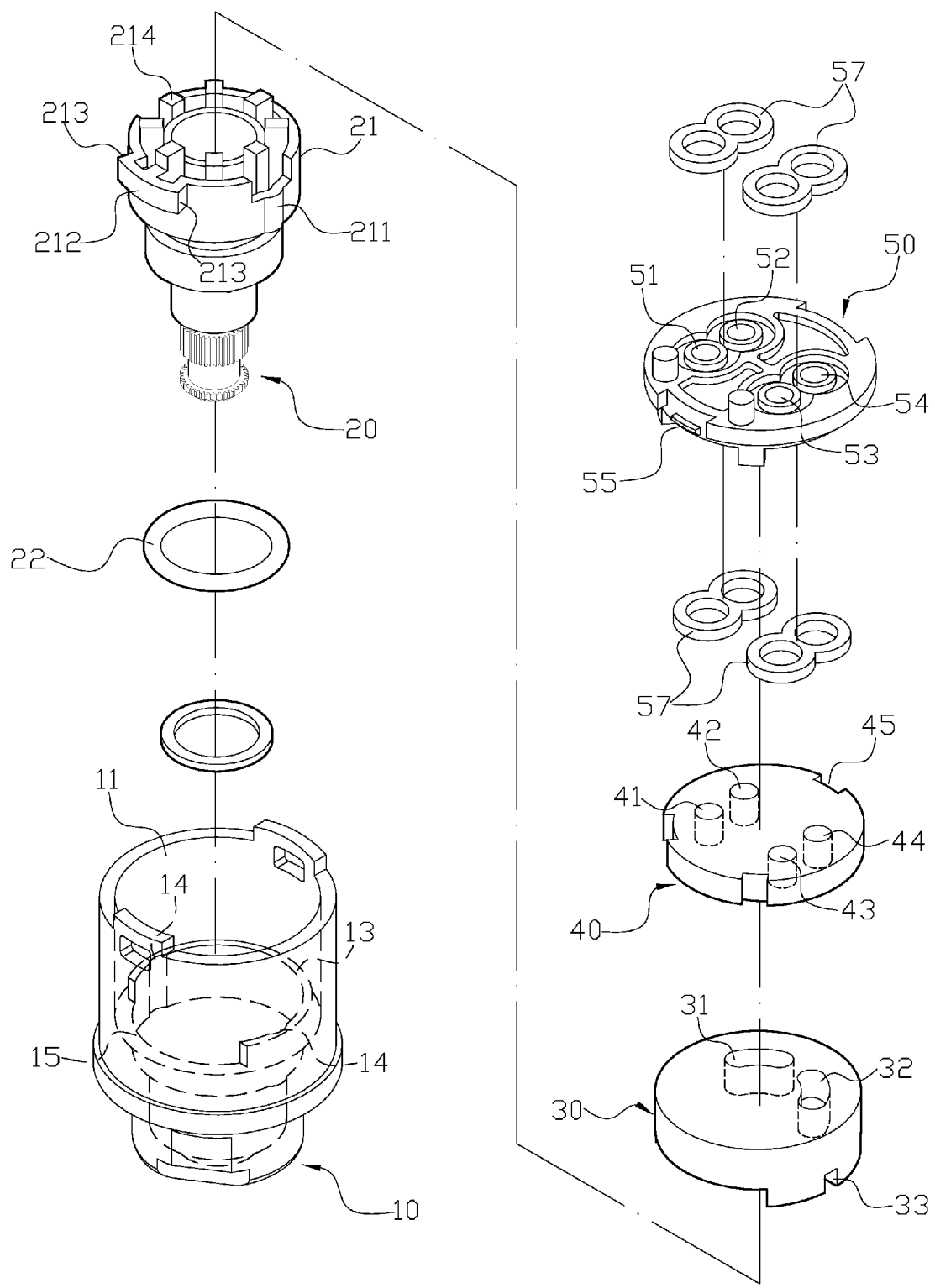
FIG. 3 is a three-dimensional, exploded view from another angle of the control valve for water channel in the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 6, the present invention provides a control valve for water channel, which comprises of, from top to bottom, a control shaft bolt (20), a sliding valve disc (30), a fixing valve disc (40) and a valve base (50). A valve shell (10) combining with the valve base (50) covers around a lower portion of the control shaft bolt (20), the sliding valve disc (30) and the fixing valve disc (40) to prevent mentioned components from falling out. The valve shell (10) has a compartment (11), and an opening (12) is formed at a top portion of the valve shell (10). The control shaft bolt (20) is secured in the compartment (11) of the valve shell (10), and an upper portion of the control shaft bolt (20) penetrates through the opening (12) to stick out from the valve shell (10). An arc edge (13) vertically protrudes from an inner wall of the valve shell (10), and two locating slots (14) are formed at relative positions on the arc edge (13) with proper angle. An interval is formed between two ends of the arc edge (13) to receive a rotating channel (15), and the position of the rotating channel (15) is limited by the arc edge (13). By connecting the control shaft bolt (20) to a shaft base (21), the shaft base (21) can be driven to rotate with control shaft bolt (20) simultaneously. Two locating pieces (211) are formed at an outer periphery of the shaft base (21), and a driving block (212) having an arc edge protrudes from an upper portion of the outer periphery of the shaft base (21). Two blocking edges (213) are formed at two lateral sides of the driving blocking (212) to achieve blocking effect, and a plurality of driving pins (214) protrudes from a bottom of the shaft base (21). The bottom of the sliding valve disc (30) has two recessed portions which are a first water sink (31) and a second water sink (32), and the first water sink (31) and the second water sink (32) are separated with an angle. A plurality of driving grooves (33) is formed at a top of the sliding valve disc (30), and when the sliding valve disc (30) connects to a top of the fixing valve disc (40) in the compartment (11), the driving pins (214) are engaged with the driving grooves (33). The fixing valve disc (40) is penetrated to form a first water inlet (41) and a first water outlet (42) on one side, and to form a second water inlet (43) and a second water outlet (44) on the other side. Also, the first water inlet (41) and the second water inlet (43) are aligned with the first water outlet (42) and the second water outlet (44). A periphery edge of the fixing valve disc (40) comprises of engaging slots (45) to connect the fixing valve disc (40) with the valve base (50). The valve base (50) has a first inlet hole (51), a first outlet hole (52), a second inlet hole (53) and a second outlet hole (54), which are at corresponding positions of the first water inlet (41), the first water outlet (42), the second water inlet (43) and the second water outlet (44). A connecting piece (44) are formed at a lateral periphery of the valve base (50) to upwardly engage with the valve shell (10), and engaging blocks (56) protrude from a surface of the valve base (50) to engage with the engaging slots (45). As a result, the fixing valve disc (40) can be loaded and secured on the top of the valve base (50).

In one embodiment, an O-ring (22) is affixed to an outer periphery of the shaft base (21) of the control shaft bolt (20).

In another embodiment, gaskets (57) are affixed to positions on the top and the bottom of the valve base (50), corresponding to the first inlet hole (51), the first outlet hole (52), the second inlet hole (53) and the second outlet hole (54).

Figure 4:
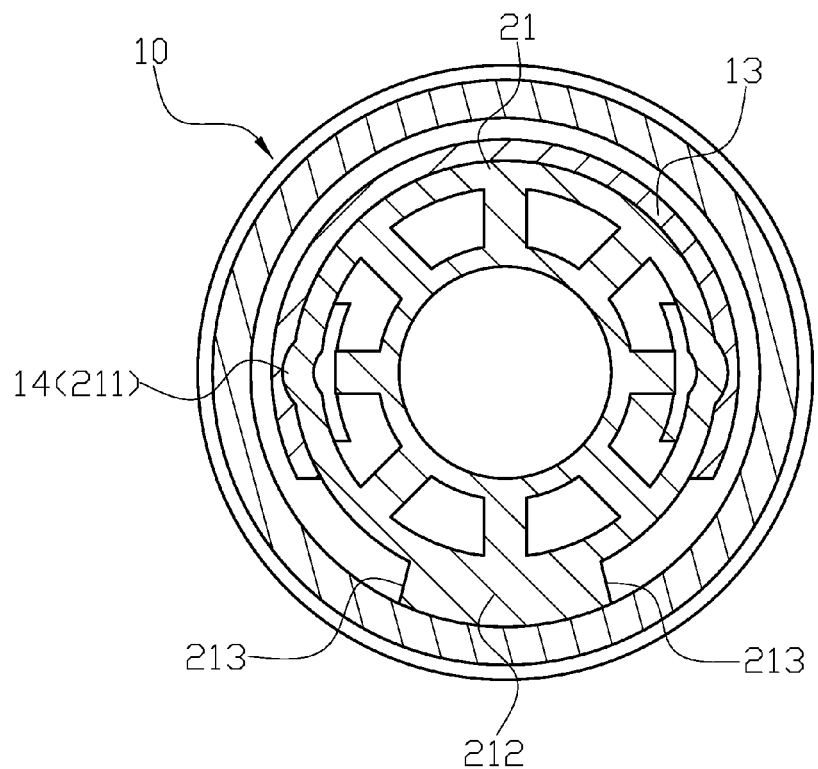
FIG. 4 is a sectional, assembly diagram of the control valve for water channel of the present invention when the control valve is closed.
Figure 5:
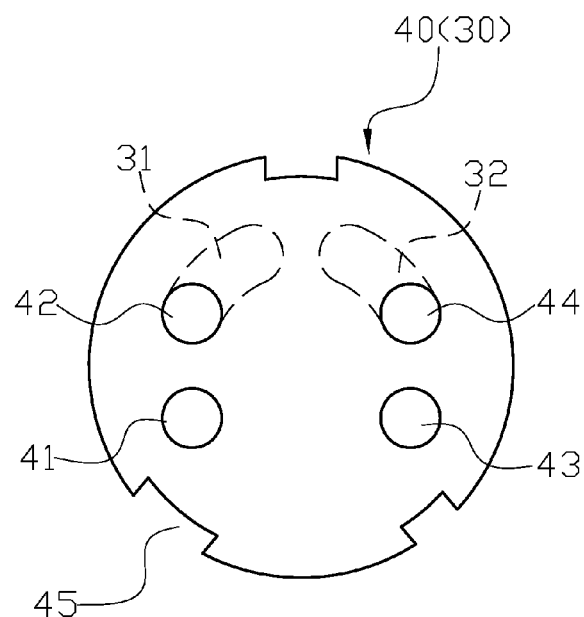
FIG. 5 is a sectional, schematic view of the relative positions of the sliding valve disc and the fixing valve disc of the control valve for water channel in the present invention when the control valve is closed.
Figure 9:
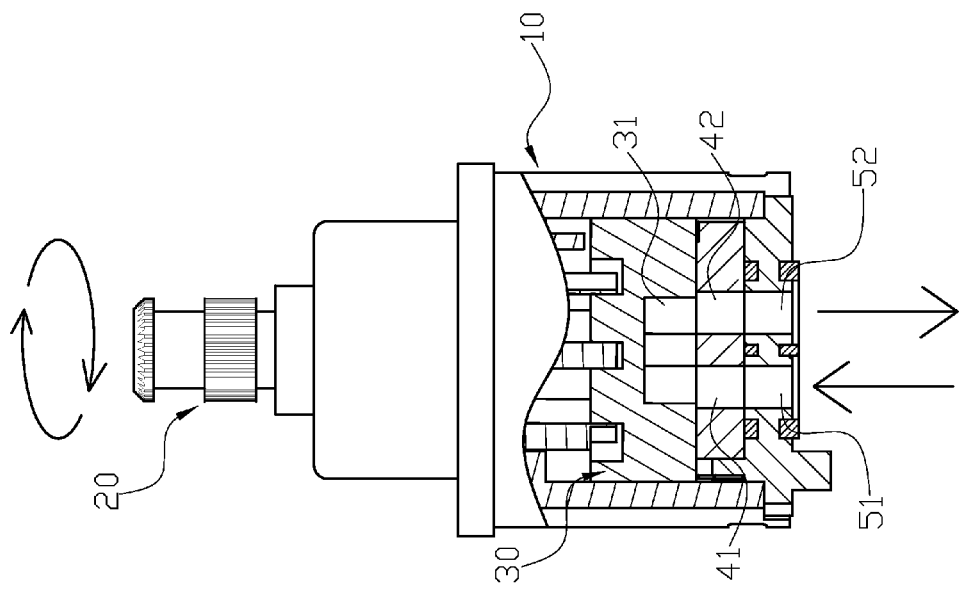
FIG. 9 is a sectional view of the control valve for water channel of the present invention after the control valve is rotated in one direction to provide the first kind of water source.
Figure 6:
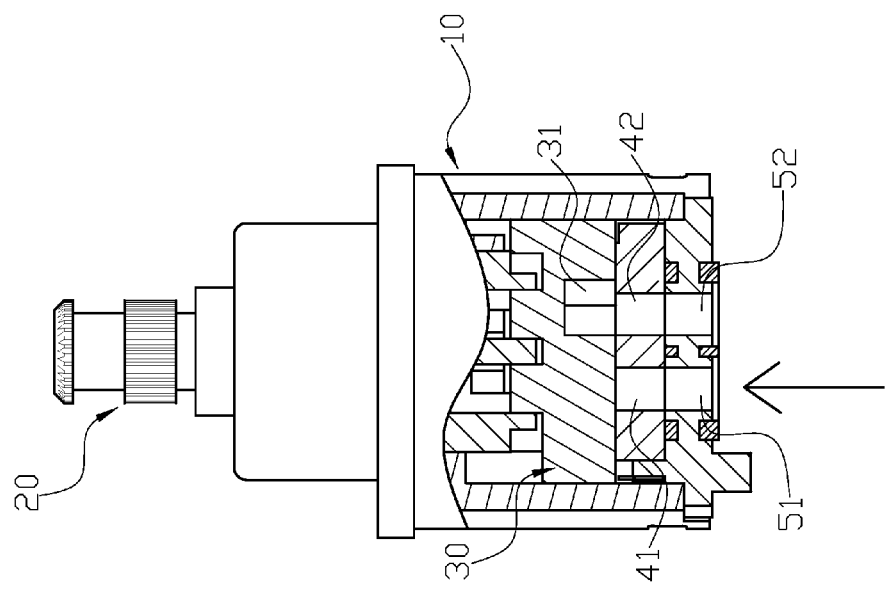
FIG. 6 is a sectional, schematic view from another angle of the control valve for water channel of the present invention when the control valve is closed.
Figure 7:
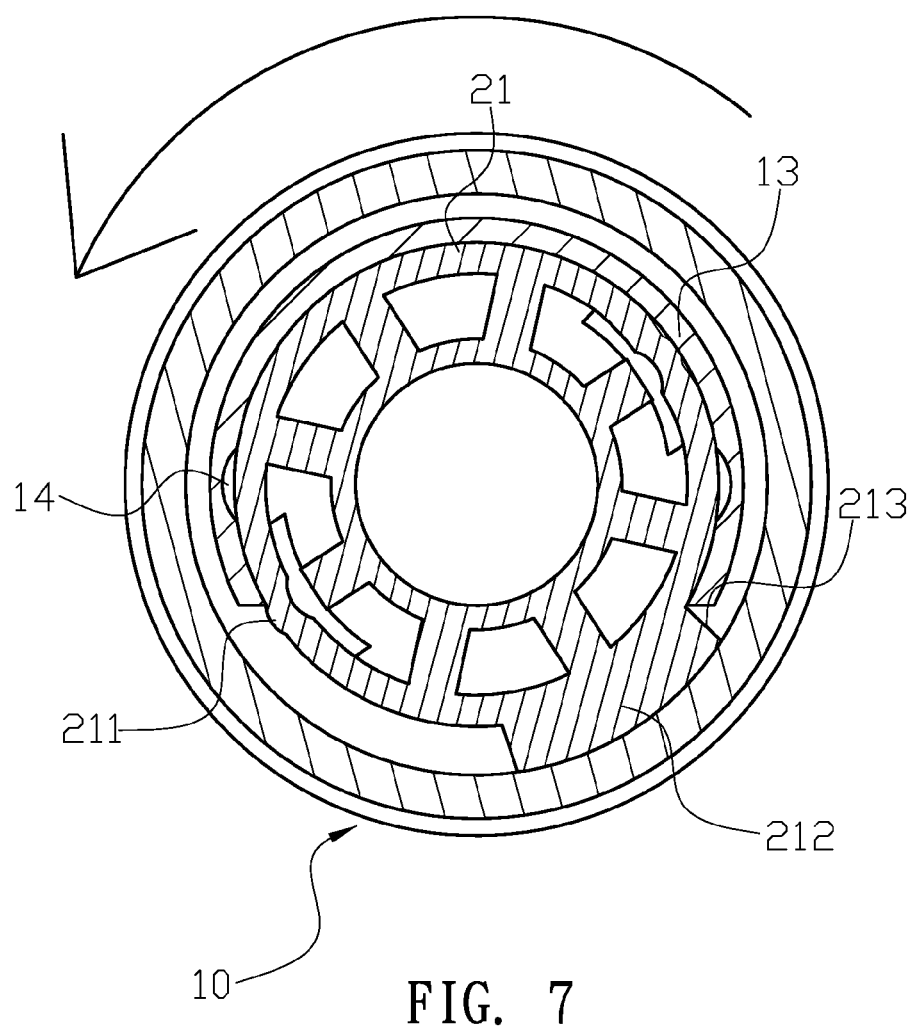
FIG. 7 is a schematic view of the control valve for water channel of the present invention when the control valve is rotated in one direction.
Figure 10:
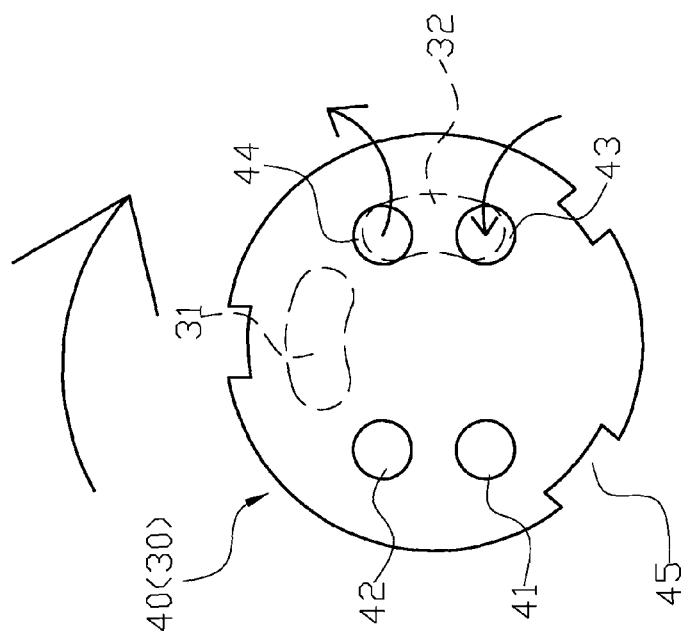
FIG. 10 is a schematic view of the control valve for water channel of the present invention after the control valve is rotated in the other direction to provide the second kind of water source.
Figure 8:
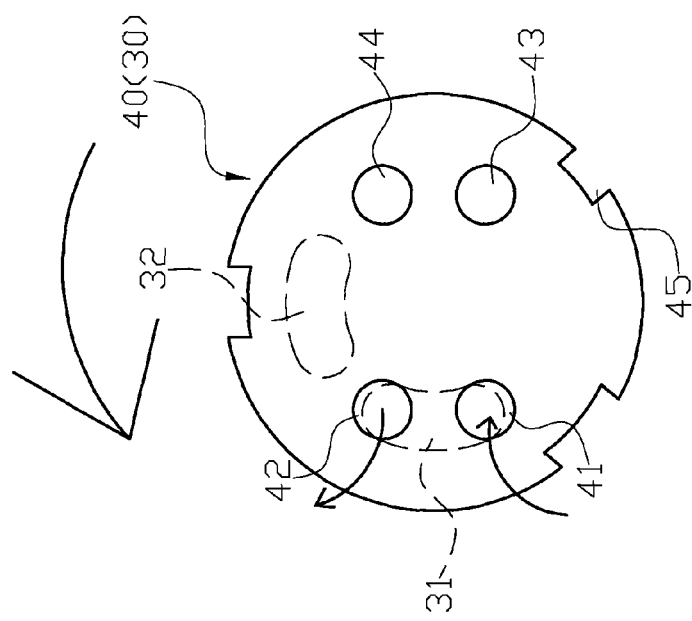
FIG. 8 is a schematic view of the control valve for water channel of the present invention after the control valve is rotated in one direction to provide the first kind of water source.

In actual application, a first kind of water source such as cold water or tap water is conducted by the first water inlet (41) through the first inlet hole (51) into the control valve, and a second kind of water source such as hot water or purified water is conducted by the second water inlet (43) through the second inlet hole (53) into the control valve. As a result, the amount and the open/close operation of the two different kinds of water sources can be operated and controlled by a single control valve of the water channel. Before the control shaft bolt (20) is rotated, the two locating pieces (211) are engaged with the locating slots (14) of the valve shell (10) to keep the driving block (212) align with a center portion of rotating channel (15) (as shown in FIG. 4). Also, the maximum rotation angle of the control shaft bolt (20) is limited while the blocking edge (213) bears against the arc edge (13). The control valve can be closed by misaligning the first water sink (31) and the second water sink (32) with the first water inlet (41) and the second water inlet (43), leading to the first water inlet (41) and the second water inlet (43) blocked by the sliding valve disc (30) (as shown in FIGS. 5 and 6). When the first kind of water source is needed, a user can rotate the control shaft bolt (20) in one direction to drive the sliding valve disc (30). Referring to FIGS. 7 to 9, by aligning the first water sink (31) with the first water inlet (41) and the first water outlet (42), the first water source from the first inlet hole (51) can flow through the first water inlet (41), first water sink (31) and first water outlet (42), and flow out of the control valve from the first outlet hole (52). Further, the control valve can be closed by rotating the control shaft bolt (20) back to initial position. On the other hand, referring to FIG. 10, when the faucet has to provide the second kind of water source, a user can rotate the control shaft bolt (20) in the other direction to align the second water sink (32) with the second water inlet (43) and the second water outlet (44), leading to providing the second kind of water source.

Comparing with conventional control valve for water channel, the present invention is advantageous because: (i) the amount and the open/close operation of the two different kinds of water sources can be operated and controlled by a single control valve of the water channel to simplify the complexity in structure; and (ii) it is convenient for a user to control the amount and the open/close operation of two different kinds of water sources by a single control valve.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A control valve for water channel, comprising: from top to bottom, a control shaft bolt, a sliding valve disc, a fixing valve disc and a valve base, and a valve shell combining with the valve base covering around a lower portion of the control shaft bolt, the sliding valve disc and the fixing valve disc to prevent mentioned components from falling out, the valve shell having a compartment, and an opening formed at a top portion of the valve shell, the control shaft bolt secured in the compartment of the valve shell, and an upper portion of the control shaft bolt penetrating through the opening to stick out from the valve shell, by connecting the control shaft bolt to a shaft base, the shaft base can be driven to rotate with control shaft bolt simultaneously, wherein the bottom of the sliding valve disc has two recessed portions which are a first water sink and a second water sink, and the fixing valve disc is penetrated to form a first water inlet and a first water outlet on one side, and to form a second water inlet and a second water outlet on the other side, wherein said valve base has a first inlet hole, a first outlet hole, a second inlet hole and a second outlet hole, which are at corresponding positions of the first water inlet, the first water outlet, the second water inlet and the second water outlet, wherein the sliding valve disc, the fixing valve disc and valve base are connecting sequentially in the compartment, and the fixing valve disc is engaged with the engaging portion of the valve base while the sliding valve disc is upwardly connected to the shaft base, wherein a plurality of driving pins protrudes from a bottom of the shaft base, and a plurality of driving grooves is formed at a top of the sliding valve disc, and when the sliding valve disc connects to a top of the fixing valve disc in the compartment, the driving pins are engaged with the driving grooves.

2. The control valve for water channel of claim 1, wherein an arc edge vertically protrudes from an inner wall of the valve shell, and two locating slots are formed at relative positions on the arc edge, and an interval is formed between two ends of the arc edge to receive a rotating channel, two locating pieces are formed at an outer periphery of the shaft base, wherein a driving block having an arc edge protrudes from an upper portion of the outer periphery of the shaft base, and two blocking edges are formed at two lateral sides of the driving blocking to achieve a blocking effect, wherein before the control shaft bolt is rotated, and the two locating pieces are engaged with the locating slots of the valve shell to keep the driving block aligned with a center portion of rotating channel.

3. The control valve for water channel of claim 1, wherein the first water inlet and the second water inlet are aligned with the first water outlet and the second water outlet.

4. The control valve for water channel of claim 1, wherein a periphery edge of the fixing valve disc comprises of engaging slots, and a connecting piece are formed at a lateral periphery of the valve base to upwardly engage with the valve shell, and engaging blocks engage with the engaging slots to load and secure the fixing valve disc on the top of the valve base.

5. The control valve for water channel of claim 1, wherein an O-ring is affixed to the outer periphery of the shaft base of the control shaft bolt.

6. The control valve for water channel of claim 1, wherein gaskets are affixed to positions on the top and the bottom of the valve base, corresponding to the first inlet hole, the first outlet hole, the second inlet hole and the second outlet hole.

* * * * *